United States Patent [19]

Tamaki et al.

[11] 4,415,644
[45] Nov. 15, 1983

[54] ELECTROSTATIC IMAGE DEVELOPING TONER AND A METHOD FOR THE PRODUCTION THEREOF

[75] Inventors: Kiyoshi Tamaki; Hideki Murata; Sadatugu Terada; Tsuneo Wada, all of Hino; Akitoshi Matsubara; Hiroyuki Takagiwa, both of Hachioji, all of Japan

[73] Assignee: Konishiroku Photo Industry Co., Ltd., Tokyo, Japan

[21] Appl. No.: 296,067

[22] Filed: Aug. 25, 1981

[30] Foreign Application Priority Data

Aug. 26, 1980 [JP]  Japan ................................ 55-117918

[51] Int. Cl.$^3$ ............................ G03G 9/08; G08J 3/20
[52] U.S. Cl. ................................... 430/106.6; 430/111; 430/109; 430/137

[58] Field of Search ............ 430/137, 109, 111, 106.6; 526/199, 200, 202, 216, 225, 233, 236, 237

[56] References Cited

U.S. PATENT DOCUMENTS

| | | | |
|---|---|---|---|
| 4,035,563 | 7/1977 | Tachibana et al. | 526/199 |
| 4,085,267 | 4/1978 | Morningstar et al. | 526/200 |
| 4,231,919 | 11/1980 | Isaacson | 430/109 |

*Primary Examiner*—John E. Kittle
*Assistant Examiner*—John L. Goodrow
*Attorney, Agent, or Firm*—Jordan B. Bierman; Linda Bierman

[57] ABSTRACT

An electrostatic image developing toner comprising polymer particles produced by suspension polymerization of a polymerizable monomer in the presence of an emulsification-preventing agent. Such toners produce images of high image density.

25 Claims, No Drawings

ELECTROSTATIC IMAGE DEVELOPING TONER AND A METHOD FOR THE PRODUCTION THEREOF

This Application claims the priority of Japanese No. 117918/80, filed Aug. 26, 1980.

The present invention relates to an electrostatic image developing toner and a method for the production thereof, and more particularly to an electrostatic image developing toner having excellent toner characteristics free from the occurrence of fog as well as offset phenomenon.

Generally, in the image forming process in accordance with electrophotography, a toner image is produced in such a manner that the photoconductive layer of a photosensitive body is uniformly charged by means of a corona charger. The charged photoconductive layer is then imagewise exposed to a light image by exposure means to thereby reduce or remove the charge from the light-exposed area thereof to form an electrostatic image on the said photoconductive layer. The resulting electrostatic latent image is made visible by development with a developer composed principally of a toner. This toner image is either recorded as it is as a permanent image, or is transferred onto a reproduction material sheet such as a transfer paper and then fixed as a permanent image.

The developing methods which use the above toner developer may be divided into two types; a dry development process and a wet development process. Consequently, the corresponding developers are classified as dry developers and wet developers. The dry developer comprises a toner obtained by mixing a carrier material such as a thermoplastic resin, fusible resin, etc., with a coloring agent such as a dye or pigment; while the wet developer, also called a liquid developer, is one that is obtained by dispersing a coloring agent such as a dye or pigment into a solution containing a carrier material such as a resin. Of these developers, the present invention is directed especially to toners for dry developers.

The toner for use in dry development has theretofore been produced by mixing and fusing a pigment such as carbon black with a thermoplastic resin to produce thereby a uniformly dispersed mixture, which is then pulverized to a powder having the required particle size.

However, a method for the production of a toner such as described above, because it needs fusing and pulverizing, has disadvantages in that it requires, for example, a toner material that becomes fluidized at an appropriate temperature thereby to cause the pigment thereof to become miscible uniformly. It also requires the ability to be pulverized at a considerable rate to a powder with the desired particle size by the means used for pulverizing the mixture system.

At the same time, if an easily pulverizable material is used when the material is present inside the copying apparatus it may become further pulverized, staining the inside thereof, and producing fog on copied images, while if a material is used which is only easily fusible, caking of the toner as well as the staining (toner filming) on the surface of the photoconductive layer may occur.

Further, if the pigment embedded in the resin appears on the outside at the time of being pulverized, it may cause a partial unevenness of frictional charge characteristics or may give rise to a moisture-resistance problem.

Another significant undesirable problem, aside from the above, is that the toner produced by the pulverization is in an indeterminate form. This tends to cause a cohesion of toner particles, which may undesirably interfere with the stability of the toner in storage, the dispensing characteristics in the supply of the toner, the sharpness of the developed image, and the cleaning characteristics in the case of repeated use of the toner, thus adversely affecting the image as to qualities such as resolution, sharpness, fog and the like.

In contrast to the production of toner in accordance with these pulverization methods; for example, Japanese Patent Examined Publications Nos. 10231/1961, 10799/1968, and 14895/1976 describe methods for the production of toner by polymerization. The methods in the publications are capable of making up for the above-mentioned disadvantages in pulverization, but create different drawbacks such as the lowering of toner density, occurrence of fog due to the instability of charging characteristics, and significant deterioration of toner with changes of the charged quantity in the successive copying operations.

As means of overcoming such defects in the polymerization, there has been known the use of such fluidizing agents as ethyl cellulose resin, polyurethane resin, amino resin, epoxy resin, alkyd resin and the like as described in, e.g., Japanese Patent Examined Publication No. 51830/1972.

However, the toner obtained by the use of such fluidizing agents as ethyl cellulose resin, epoxy resin, alkyd resin, etc. gives rise to new problems of deterioration in the moisture-resistance and emission of offensive odor; exercises a bad influence upon the hygroscopicity of the toner, and hinders the obtaining of stable toner images. If polyurethane resin, amino resin, etc. are used, they are subject to a slight thermal decomposition and emit a bad odor, so that such uses cannot be accepted from the standpoint of the operational environment and efficiency.

Besides, when a surfactant or water-soluble macromolecular material is used as a dispersion assistant during the suspension polymerization, emulsified particles (latex) are produced in the water stratum. The produced latex may be removed to some extent by washing, but the majority is fairly strongly adsorbed onto the surface of the toner particles, causing clogging at the time of washing and drying.

Further, when the above-described emulsified particles are adsorbed on the surface of toner, they attach to the photosensitive body or carrier as a result of repeated use of the toner, causing changes in the electrophotographic characteristics. Further, the toner becomes whitish, which may reduce the toner density.

An object of the present invention is to provide an electrostatic image developing toner having high darkening density as well as not causing any change in electrophotographic characteristics, even when used repeatedly over a long period of time.

The results of our study show that the above object is attainable by the use of the electrostatic image developing toner produced in accordance with the process for the formation of polymer particles by suspension polymerization this reaction is effected under conditions wherein a polymerizable monomer is dispersed in an aqueous medium in the presence of an emulsification polymerization-preventing agent. The present invention is characterized in that the formation of the foregoing latex, produced when suspension-polymerizing a monomer composition of toner as described above, may be prevented by having an emulsification polymerization-preventing agent present during the polymerization.

Emulsification polymerization-preventing agents effectively usable in the present invention include, for example, molybdic acid salts of alkali metals, ammonium, and magnesium; nitrous acid salts of alkali metals, alkaline earth metals, antimony and the like; halogenated compounds such as potassium bromide, sodium bromide, potassium iodide, sodium iodide, calcium iodide, and ammonium iodide; manganese compounds such as manganese chloride, manganese nitrate, manganese sulfate, manganese acetate, manganese methacrylate and the like; calcium chloride, magnesium chloride, magnesium sulfate, magnesium acetate, barium chloride, potassium ferricyanate, potassium hypophosphite, sodium hypophosphite, potassium phosphite and the like.

Other examples include hydrochloric acid salts, nitric acid salts and sulfuric acid salts of cobalt and nickel; and complex salts and double salts such as hexamine cobalt (III) chloride, ammonium nickel sulfate and the like.

The above-described emulsification polymerization-preventing agents usable in this invention are used for the purpose of preventing the emulsification polymerization, but when used in an excessive amount, then they also restrain the suspension polymerization, so that the polymerization may sometimes not be completed. Accordingly, the adequate range of the useful amount, although it depends somewhat upon the kind of emulsification polymerization-preventing agents, may be from 0.001 to 5 parts by weight per part by weight of monomer used.

Examples of suitable monomers for use in the present invention include α-β unsaturated monomers such as, styrene, o-methyl styrene, m-methyl styrene, p-methyl styrene p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chlorostyrene, 3,4-dichlorostyrene, and the derivatives of these styrenes. The most preferred compound is styrene monomer. As other vinyl monomers, there may include, for example, ethylene unsaturated monoolefins such as ethylene, propylene, butylene, isobutylene and the like; halogenated vinyls such as vinyl chloride, vinylidene chloride, vinyl bromide, vinyl fluoride, and the like; vinyl esters such as vinyl acetate, vinyl propionate, vinyl benzoate, vinyl butyrate and the like; α-methylene aliphatic monocarboxylic acid esters such as methyl acrylate, ethyl acrylate, n-butyl acrylate, isobutyl acrylate, propyl acrylate, n-octyl acrylate, dodecyl acrylate, 2-ethyl-hexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethyl-hexyl methacrylate, stearyl methacrylate, phenyl methacrylate, dimethyl-amino-ethyl methacrylate, diethyl-amino-ethyl methacrylate, the the like; acrylic or methacrylic acid derivatives such as acrylonitrile, methacrylonitrile, acrylamide and the like; vinyl ethers such as vinyl methyl ether, vinyl ethyl ether, vinyl iso-butyl ether and the like; vinyl ketones such as vinyl-methyl ketone, vinyl-hexyl ketone, vinyl isopropenyl ketone and the like; N-vinyl compounds such as N-vinyl pyrrole, N-vinyl carbazole, N-vinyl indole, N-vinyl pyrolidone and the like; and vinyl naphthalenes.

In polymerizing the polymer of the present invention, an arbitrary polymerization initiator, especially an oil-soluble polymerizable initiator, may be used at a temperature in the normal temperature range. Examples of such initiators include benzoyl peroxide, lauryol peroxide, 2,2'-azo-bis-isobutylonitrile, 2,2'-azo-bis-(2,4-dimethyl valeronitrile), benzoyl orthochlor peroxide, benzoyl orthomethoxy peroxide and the like. The polymerization may be carried out under normal pressure or increased pressure.

The suspension polymerization of the present invention may be performed in an ordinary manner in the presence of such a dispersant as, e.g., gelatin, starch, polyvinyl alcohol, barium sulfate, calcium sulfate, talc, clay, diatomaceous earth or a powder of metallic oxides.

The method for the production of the toner of the present invention is illustrated in further detail below:

During the process for polymerizing the foregoing monomer, there may be added a coloring agent and other toner characteristic-providing agents such as a charging control agent, fluidizing agent and the like and, after completion of the polymerization, the polymerized product is preferably granulated so as to be used as it is as a toner. It may also be pulverized if needed so as to obtain a toner having a desired particle size or, after completion of the polymerization of the monomer, coloring agents and the like may be mixed with the polymerized product by kneading, cooled and pulverized to thereby produce the toner.

The molecular weight of the polymer of the present invention may vary widely but preferably is from 50,000 to 1,000,000, most preferably from 50,000 to 200,000.

The polymer of the present invention may be bridge-structured polymer obtained by polymerizing in the presence of a bridging agent. Suitably usable bridging agents are such compounds as those having two or more polymerizable double bonds, including, for example, aromatic divinyl compounds such as divinyl benzene, divinyl naphthalene, and the derivatives thereof; diethylenic carboxylic acid esters such as ethylene-glycol dimethacrylate, diethylene-glycol methacrylate, triethylene-glycol methacrylate, trimethylol-propane triacrylate, acryl methacrylate, t-butyl-amino-ethyl methacrylate, tetraethylene-glycol dimethacrylate, 1,3-butane-diol dimethacrylate, and the like; all divinyl compounds such as N,N-divinyl aniline, divinyl ether, divinyl sulfide, divinyl sulfone and the like; and compounds having three or more vinyl groups and the like. These compounds may be selected in singly or in a mixture. Further, there may also be used, as bridging agents for the present invention, dihydric alcohols such as ethylene glycol, triethylene glycol, 1,2-propylene glycol, 1,3-propylene glycol, 1,4-butane diol, neopentyl glycol, 1,4-butene diol, 1,4-bis(hydroxyl-methyl) cyclohexane, bis-phenol A, hydrogenated bis-phenol A, polyoxy-ethylenated bis-phenol A, polyoxy-propylenated bis-phenol A and the like; dibasic acids and the derivatives thereof such as maleic acid, fumaric acid, mesaconic acid, citraconic acid, itaconic acid, glutaconic acid, phthalic acid, isophthalic acid, terephthalic acid, cyclohexane-dicarboxylic acid, succinic acid, adipic acid, sebacic acid, malonic acid, and anhydrides of these acids or esters of these acids with lower alcohols; trihydric or polyhydric alcohols such as glycerol, trimethylol propane, pentaerythritol and the like; and trihyric or polyhydric carboxylic acids such as trimellitic acid, pyromellitic acid and the like.

The amount of such bridging agents added to the monomers may be from 0.005 to 20% by weight, preferably from 0.1 to 5% by weight. If the quantity is extremely large, the toner tends to lose fixibility while, if it is extremely small, the toner tends to have poor durability, storability, wear-resistance, etc. Particularly in copying apparatus of the heat-roll fixing type, it is difficult to provide the extension of the molecular weight distribution of polymers by bridging and, as a result, the prevention of the offset phenomenon at the time of the fixation.

The toner of the present invention may contain a low molecular weight olefin polymer known as a mold releasing agent. The low molecular weight olefin polymer may be present together with carbon black either during the process for polymerizing the monomer or in the course of the pulverization after the polymerization, but in the present invention, it is preferable that these materials be present during the polymerization.

The low molecular weight olefin polymer should be either low molecular olefin polymers that contain olefins alone as monomer components, or olefin copolymers that contain as monomers components other than olefins. Olefins as the monomer components include all olefins such as ethylene, propylene, butene-1, pentene-1, hexene-1, heptene-1, octene-1, nonene-1, decene-1 or the homologs of these compounds differing in the unsaturation bonding position, or, for example, 3-methyl-1-butene, 3-methyl-2-pentene, 3-propyl-5-methyl-2-hexane and the like into which are introduced alkyl groups as branched chains.

Monomers other than olefins as the monomer component, form copolymers together with olefins, resulting in such polymers as vinyl ethers such as vinyl-methyl ether, vinyl-n-butyl ether, vinyl-phenyl ether and the like; vinyl esters such as vinyl acetate, vinyl butyrate and the like; halo-olefins such as vinyl fluoride, vinylidene fluoride, tetrafluoroethylene, vinyl chloride, vinylidene chloride, tetrachloroethylene and the like; acrylic or methacrylic acid esters such as methyl acrylate, ethyl acrylate, n-butyl acrylate, methyl methacrylate, ethyl methacrylate, n-butyl methacrylate, stearyl methacrylate, N,N-dimethylamino-ethyl methacrylate, t-butyl-amino-ethyl-methacrylate and the like; acryl type derivatives such as acrylonitrile, N,N-dimethyl acrylamide and the like; organic acids such as acrylic acid, methacrylic acid, maleic acid, fumaric acid, itaconic acid and the like; diethyl fumarate, β-pinene and the like.

The low molecular weight olefin polymer of the present invention includes such olefin polymers comprising olefins alone containing at least two or more monomer components as described above, such as ethylene-propylene copolymer, ethylene-butene copolymer, ethylene-pentene copolymer, propylene-butene copolymer, propylene-pentene copolymer, ethylene-3-methyl-1-butene copolymer, ethylene-propylene-butene copolymer and the like or other olefin copolymers containing, as monomer components, at least one of the foregoing olefins and at least one of the foregoing monomers excluding olefins; such as ethylene-vinyl acetate copolymers, ethylene-vinyl-methyl ether copolymer, ethylene-vinyl chloride copolymer, ethylene-methyl acrylate copolymer, ethylene-methyl methacrylate copolymer, ethylene-acrylic acid copolymer, propylene-vinyl acetate copolymer, propylene-vinyl-ethyl ether copolymer propylene-ethyl acrylate copolymer, propylene-methacrylic acid copolymer, butene-vinyl-methyl methacrylate copolymer, pentene-vinyl acetate copolymer, hexene-vinyl butyrate copolymer, ethylene-propylene-vinyl acetate copolymer, ethylene-vinyl acetate-vinyl-methyl copolymer, ethylene-vinyl acetate vinyl-methyl ether copolymer and the like.

Of these low molecular weight olefin polymers of the present invention, in those containing monomers other than olefins as the monomer component, the olefin component content in the copolymer should be as large as possible because, in general, the smaller the olefin component content, the smaller the mold releasability. Also, the characteristics of fluidity, image quality, etc. of the toner tend to deteriorate. Therefore, the olefin component content in copolymers should preferably be as large as possible, especially those containing olefin components of greater than about 50 mol % are effectively usable in the present invention.

The molecular weight of the low molecular weight olefin polymer of the present invention should be in the same range as this term is used in connection with normal macromolecular compounds, but generally in the range of from 1,000 to 45,000, preferably from 2,000 to 6,000, weight average molecular weight (MW).

The low molecular weight olefin polymer of the present invention should have a softening point of from 100° to 180° C., preferably from 130° to 160° C.

The quantity of the low molecular weight olefin polymer of the present invention used should be from 1 to 20 parts by weight, preferably from 3 to 15 parts by weight per 100 parts by weight of the resin component of the toner. Less than 1 part by weight sometimes causes insufficient anti-offset effect, while exceeding 20 parts by weight is undesirable because it may cause gelling to occur during the polymerization.

To improve the fixability and the anti-offset effect of the toner of the present invention, a prepolymer (particularly a reactive prepolymer) may be added during the process of polymerization. The reactive prepolymers should be those having reactive groups in the principal chain and/or side chain thereof, and such reactive groups include carboxyl group, sulfo group, epoxy group, ethylene-imino group, isocyanate group, double bonding group, acid anhydrides, and the like.

Typical examples of such prepolymers are enumerated below: (Those having an epoxy group)

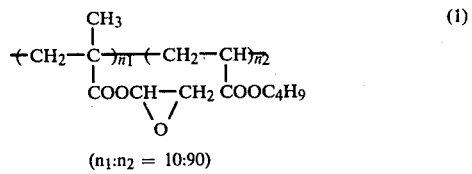

(1)

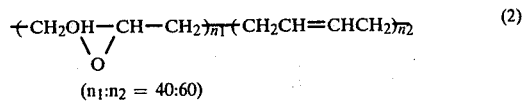

(2)

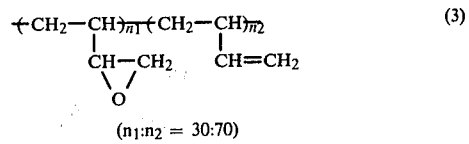

(3)

-continued

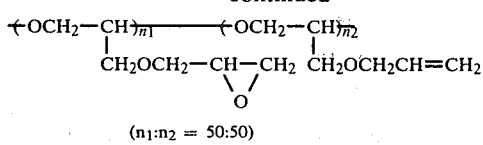 (4)

(n₁:n₂ = 50:50)

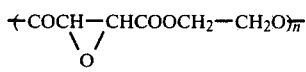 (5)

(Those having an ethylene-imino group)

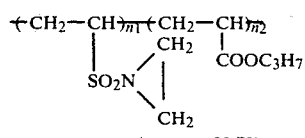 (6)

(n₁:n₂ = 30:70)

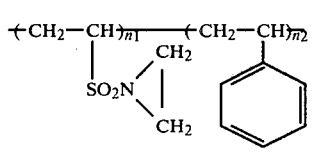 (7)

(n₁:n₂ = 60:40)

(One having an isocyanate group)

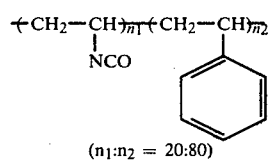 (8)

(n₁:n₂ = 20:80)

(Those having a double bonding group)

 (9)

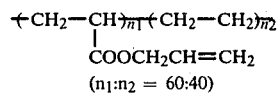 (10)

(n₁:n₂ = 60:40)

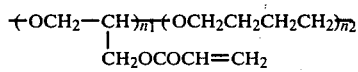 (11)

(n₁:n₂ = 50:50)

 (12)

(One having an acid anhydride)

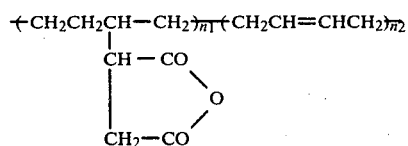 (13)

(n₁:n₂ = 60:40)

(Those having a carboxyl group)

-continued

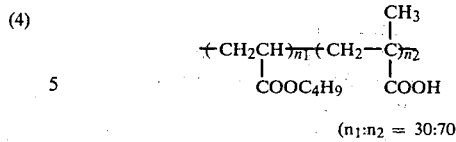 (15)

(n₁:n₂ = 30:70)

 (14)

(Those having a sulfo group)

 (16)

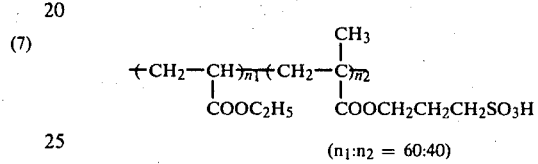 (17)

(n₁:n₂ = 60:40)

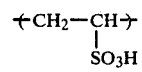 (18)

(Those subjected to bridge polymerization by light)

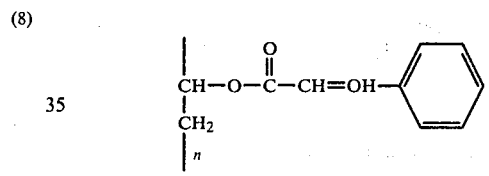 (19)

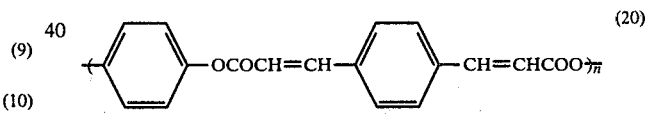 (20)

As the prepolymer, aside from these examples enumerated above, there may be also used butadiene prepolymers such as polybutadiene, having wide range of molecular weight. The range usable in the present invention is preferably from 1,000 to 500,000 in weight average molecular weight. The quantity used is generally from 5 to 95 parts by weight per 100 parts by weight of the polymerizable monomer.

In the present invention, a low molecular weight olefin polymer may be added to prevent offset at a discretional point in the production process of the toner of the present invention. Where a xerographic reproduction process is desired, the toner may be formed from a black pigment such as carbon black or a black dye such as amablast black dye, the pigment being preferred to be used in the quantity of from about 3 to 20% by weight based on the whole weight of the colored toner.

A magnetic coloring agent useful for a one-component type developing toner may also be used in the toners of the present invention. Such magnetic coloring agents are preferably materials that are strongly magnetized by a magnetic field, black, well dispersed into a resin to be chemically stable, and capable of yielding particles of less than 1μ. The most preferred agent is magnetite (triiron tetraoxide).

Typical magnetic or magnetizable materials include metals such as cobalt, iron, nickel; alloys or mixtures of such metals as aluminum, cobalt, steel, lead, magnesium, nickel, tin, zinc, antimony, beryllium, bismuth, cadmium, calcium, manganese, selenium, titanium, tungsten and vanadium; metallic compounds including metallic oxides such as aluminum oxide, iron oxide, copper oxide, nickel oxide, zinc oxide, titanium oxide and manganese oxide; refractory nitrides such as vanadium nitride, chromium nitride; carbides such as tungsten carbide, silicon carbide; ferrites; and the mixtures thereof.

These ferromagnetic materials are desirably of uniform particle size, and the quantity thereof to be contained in the toner should be from about 50 to 300 parts by weight, preferably from 70 to 200 parts by weight, per 100 parts by weight of the resin components.

All the obtained polymers of the present invention should have a softening point (ring and ball method) in the range of from 100° to 170° C. and a glass transition point of from about 40° to 110° C. If the softening point is less than 100° C., the toner is over-pulverized or causes toner-filming phenomenon which tends to produce stain on the photoconductive light-sensitive body; while, if it exceeds 170° C., not only is the pulverization almost impossible because the toner is stiff, but the fixation of the toner requires a large amount of heat which deteriorates the fixing efficiency.

On the other hand, if the glass transition point is less than 40° C., the toner tends to become massive due to the cold flow phenomenon, because the normal storage condition of the toner is below 40° C.; while, if it exceeds 110° C., sufficient fixation cannot be effected, particularly in the case of a rapid fixing operation. This is because, if the toner is fixed at a temperature of above 250° C., a roller made of, e.g., Teflon (manufactured by DuPont) is prone to be worn off and to decompose. Therefore, such restrictions on the heat-resistance due to the roller material itself hinders the use of an extremely high temperature.

The polymer of the present invention obtained as mentioned above may also be used after being either pulverized by a pulverizer and classified by sifting through a zigzag classifier to thereby obtain a toner with the particle size of from 1 to 50μ, or mixed with a coloring agent, kneaded by a kneader, cooled, and then pulverized to thereby produce a toner.

The formation of an image using the toner of the present invention requires the use of a photosensitive body whose photoconductive support is provided with a selenium photosensitive body; a photosensitive layer containing by dispersion in the binder resin thereof an inorganic photoconductive material such as zinc oxide, cadmium sulfide, cadmium selenide, caldmium sulfide-selenide, lead sulfide, mercury sulfide and the like; or a photosensitive layer containing in the binder resin thereof an organic photoconductive material such as anthracene, polyvinyl carbazole and the like. The surface of the photosensitive layer of such a photosensitive body is entirely charged by a corona discharge by means of a scorotron charger and is imagewise exposed to light to form an electrostatic image. The image is then developed with a developer composed of a mixture of, e.g., the toner of the present invention with glass beads or an iron powder carrier by, e.g., the cascade method or magnetic brush method. The toner image thus formed is then transferred onto a paper sheet under a corona discharge by being brought into contact with the paper by the application of pressure. The thus transferred toner image on the paper is subsequently thermally fixed by being put through a heat-fixing roller coated with a fluororesin or silicone rubber having mold-releasability.

As has been illustrated above, the electrostatic image developing toner of the present invention is produced by a method for the production of granulated polymer particles in a polymerization reaction process. The suspension polymerization of a monomer composition optionally containing a coloring agent takes place in the presence of an emulsification polymerization-preventing agent. This prevents the formation of latex during the polymerization and permits the production process to proceed smoothly. This improves the operational efficiency and produces high toner density with no fog or offset in the development process using the toner of the present invention.

Examples of the present invention are illustrated below, but the present invention is not limited thereto.

EXAMPLE 1

Seventy parts of styrene, 30 parts of n-butyl methacrylate, 5 parts of carbon black #2300 (manufactured by Mitsubishi Chemical Industry, Ltd.), 3 parts of 2,2'-azo-bis-(2,4-dimethyl valeronitrile) and 5 parts of polydiphenyl siloxane KR-216 (manufactured by Shinetsu Chemical Industry Co., Ltd.) were fully mixed and dispersed by means of a sand stirrer. Subsequently, a 700 ml aqueous solution was prepared containing tricalcium phosphate in the amount of 3% by weight, 0.04% by weight of NL-R (sodium dodecyl-benzene sulfonate), 0.06% by weight of ammonium molybdate, and 0.1% by weight of sodium nitrite, all based on the monomer. The foregoing dispersed mixture was added to the solution while stirring at 3,000 rpm using a TK homogenizer (manufactured by Tokushu Industry Co., Ltd.).

After the addition, the stirring rate was changed to 200 rpm, using a normal stirrer and, with this stirring rate, the polymerization reaction proceeded for six hours at a temperature of 60° C. to completion. The reaction product was cooled, treated with a dilute hydrochloric acid solution to decompose and remove the tricalcium phosphate, washed repeatedly, and then dried, thereby obtaining a toner of the present invention with an average particle size of 12μ. In this case, no emulsified particles were formed in the reaction solution, so that the filtration was easily carried out.

Further, 5 parts of the thus obtained toner and 95 parts of DSP iron powder (manufactured by Dowa Iron Powder Industry Co., Ltd.) were mixed together to produce a two-component developer, which was then used to make reproduction copies with the use of a U-Bix V (manufactured by Konishiroku Photo Industry Co., Ltd.), whereby an excellent image having a high black toner density with no fog was obtained.

EXAMPLE 2

Eighty-five parts of styrene, 15 parts of carbon black #30 (manufactured by Mitsubishi Chemical Industry, Ltd.), 3 parts of 2,2'-azo-bis-(2,4-dimethyl valeronitrile), 5 parts of polydiphenyl siloxane KR-216 (manufactured by Shinetsu Chemical Industry Co., Ltd.) and 10 parts of Nisso-PBG-300 (polybutadiene prepolymer, maufactured by Nippon Soda Co., Ltd.) were mixed and fully dispersed by means of a sand stirrer. Then, there was prepared a 700 ml aqueous solution containing tricalcium phosphate in the amount of 3% by weight, 0.2% by weight of calcium bromide, 0.2% by weight of sodium nitrite, 0.04% by weight of NL-R, all based on the above monomer. To this solution, while stirring at the rate of 4,000 rpm by means of a TK homogenizer (manufactured by Tokushu Industry Co., Ltd.), was added the above dispersed mixture.

The procedures after that were carried out in the same manner as in Example 1, thereby producing a toner of the present invention, and a copying test was made, using the resulting toner; a satisfactory image having a high black toner density with no fog and free from offset phenomenon was obtained.

EXAMPLE 3

Eighty-five parts of styrene, 15 parts of n-butyl acrylate, 5 parts of carbon black #30 (manufactured by Mitsubishi Chemical Industry, Ltd.), 3 parts of 2,2'-azobis-(2,4-dimethyl valeronitrile), 5 parts of polydiphenyl siloxane KR-216 and 10 parts of Nisso-PBG-300 were mixed and fully dispersed by means of a sand stirrer. There was prepared a 700 ml aqueous solution containing tricalcium phosphate in the amount of 3% by weight, 0.004% by weight of potassium iodide, 0.05% by weight of hydrogen peroxide (30%), and 0.04% by weight of NL-R, all based on the above monomer. To this solution, while stirring at the rate of 4,500 rpm by means of a TK homogenizer, was added the above dispersed mixture. The subsequent procedures were performed in the same manner as in Example 1 to produce a toner of the present invention.

The resulting toner was used to make a copying test, thereby obtaining an image having a high black toner density with no fog and free from the occurrence of any offset phenomenon.

EXAMPLE 4

There was carried out the same procedure as in Example 2 with the exception that 3.5 parts of hydrogen peroxide (30% aqueous solution) was used in place of the potassium bromide and sodium nitrite. No growth of emulsified particles was found, and filtration of the product could be carried out without difficulty. The resulting toner of the present invention was used in a copying test, and the results showed an image having a high black toner density with no fog and free from offset phenomenon.

EXAMPLE 5

The procedure of Example 1 was followed except that 0.1 parts of manganese chloride and 0.5 parts of hydrogen peroxide (30% aqueous solution) were used in place of the ammonium molybdate and the sodium nitrite. No emulsified particles were found and filtration of the product could be carried out without difficulty. The resulting toner of the present invention was used in a copying test, and the results showed an image having a high black toner density with no fog and free from any offset phenomenon.

EXAMPLE 6

A toner of the present invention was produced in the same manner as in Example 2 except that 1 part of tetrahydrated magnesium acetate, and 1 part of hydrogen peroxide (30%) were used in place of the potassium bromide and the sodium nitrite. No emulsified particles were formed and the toner produced was excellent in black density. The toner of the present invention was used in a copying test, and a satisfactory image free of fog and offset phenomenon was obtained.

EXAMPLE 7

A high black-density toner was obtained by the application of the same procedure as in Example 2 except that 0.1 parts of potassium ferricyanide and 1 part of sodium phosphite was used in place of the potassium bromide and the sodium nitrite. A copying test of the toner also showed a satisfactory image free of fog and offset phenomenon.

EXAMPLE 8

A toner excellent in density with no formation of emulsified particles was produced by same procedure as in Example 1 except that 0.1 parts of cobalt nitrate and 0.15 parts of sodium nitrate were used in place of the ammonium molybdate and the sodium nitrite of the Example,. The resulting toner of the present invention was used in a copying test and a satisfactory image free of fog was obtained.

CONTROL 1

A toner prepared in the same manner as in Example 1, except that the ammonium molybdate and the sodium nitrite were omitted, was regarded as a control sample. Thus, the toner was produced without the emulsification polymerization-preventing agent and emulsified particles were formed which needed prolonged washing and filtration treatment time, thus resulting in inefficiency of operation as well as insufficient toner density.

In addition, measurements were made on the densities of the toners obtained in the foregoing Examples 1 through 8 and Control 1 by use of SAKURA densitometer PDA-45 (manufactured by Konishiroku Photo Industry Co., Ltd.), and the results are shown in Table 1:

TABLE 1

| Sample | Density |
| --- | --- |
| Example-1 toner | 1.25 |
| Example-2 toner | 1.22 |
| Example-3 toner | 1.26 |
| Example-4 toner | 1.23 |
| Example-5 toner | 1.25 |
| Example-6 toner | 1.21 |
| Example-7 toner | 1.22 |
| Example-8 toner | 1.20 |
| Control-1 toner | 0.90 |

As is apparent from Table 1, the toners of the present invention are excellent in that they have high toner densities as compared to that of the control toner sample.

The preferred embodiments of the present invention are:

(1) An electrostatic image developing toner and a method for the production thereof as defined in the claims wherein the emulsification polymerization-preventing agent of the present invention is a nitrite or a combination of hydrogen peroxide with a molybdate.

(2) An electrostatic image developing toner and a method for the production thereof as defined in the claims wherein the foregoing emulsification polymerization-preventing agent is a nitrite or a combination of hydrogen peroxide with a bromide compound.

(3) An electrostatic image developing toner and a method for the production thereof as defined in the claims wherein the foregoing emulsification polymerization-preventing agent is a combination of a peroxide with an iodide compound which produces iodine by the presence of the said peroxide, or iodine.

(4) an electrostatic image developing toner and a method for the production thereof as defined in the claims wherein the foregoing emulsification polymerization-preventing agent is hydrogen peroxide.

(5) An electrostatic image developing toner and a method for the production thereof as defined in the claims wherein the foregoing emulsification polymerization-preventing agent is a combination of hydrogen peroxide with a manganese compound which produces a divalent manganese ions by the presence of the said hydrogen peroxide.

(6) An electrostatic image developing toner and a method for the production thereof as defined in the claims wherein the foregoing emulsification polymerization-preventing agent is a combination of hydrogen peroxide with an inorganic or organic acid salt which produces divalent magnesium, calcium or barium ions by the presence of the hydrogen peroxide.

(7) An electrostatic image developing toner and a method for the production thereof as defined in the claims wherein the foregoing emulsification polymerization-preventing agent is a compound which produces ferricyanide ions, hypophosphoric acid ions or phosphorous acid ions in an aqueous solution.

(8) An electrostatic image developing toner and a method for the production thereof as defined in the claims wherein the foregoing emulsification polymerization-preventing agent is a combination of an inorganic or organic acid salt of cobalt or nickel with a nitrite compound or hydrogen peroxide.

(9) An electrostatic image developing toner and a method for the production thereof as defined in the claims wherein the foregoing emulsification polymerization-preventing agent is a nitrite.

(10) An electrostatic image developing toner and a method for the production thereof as defined in the claims wherein the foregoing emulsification polymerization-preventing agent is a combination of at least two of the above emulsification polymerization-preventing agents described in (2) through (9).

We claim:

1. An electrostatic image developing toner comprising a colorant, and polymer particles produced by suspension polymerization of a polymerizable monomer in the presence of an emulsification-preventing agent, said particles being from 1 to 50 microns.

2. A method for the production of electrostatic image developing toner comprising a step of forming polymer particles by suspension polymerization of a polymerizable monomer in an aqueous medium in the presence of an emulsification-preventing agent and a colorant, said particles being from 1 to 50 microns.

3. The toner of claim 1 wherein said agent is a nitrite or a mixture of hydrogen peroxide and a molybdate.

4. The toner of claim 1 wherein said agent is a nitrite or mixture of hydrogen peroxide and a bromine compound.

5. The toner of claim 1 wherein said agent is a mixture of a peroxide with iodine or an iodine compound which produces iodine in the presence of said peroxide.

6. The toner of claim 1 wherein said agent is hydrogen peroxide.

7. The toner of claim 1 wherein said agent is a mixture of hydrogen peroxide and a manganese compound which produces divalent manganese ions in the presence of said hydrogen peroxide.

8. The toner of claim 1 wherein said agent is a mixture of hydrogen peroxide with an acid salt which produces divalent magnesium, calcium, or barium ions in the presence of said peroxide.

9. The toner of claim 1 wherein said agent is a compound which produces ferricyanide ions, hypophosphoric ions, or phosphorous acid ions in an aqueous solution.

10. The toner of claim 1 wherein said agent is a mixture of an acid salt of cobalt or nickel with a nitrite or hydrogen peroxide.

11. The toner of claim 1 wherein said agent is a nitrite.

12. The toner of claim 1 wherein said agent is a mixture of at least two of
(a) a nitrite
(b) a mixture of hydrogen peroxide and a molybdate
(c) a mixture of hydrogen peroxide and a bromine compound
(d) a mixture of hydrogen peroxide and iodine or an iodine compound which produces iodine in the presence of said hydrogen peroxide.
(e) hydrogen peroxide
(f) a mixture of hydrogen peroxide and a manganese compound which produces divalent manganese ions in the presence of said hydrogen peroxide.
(g) a mixture of hydrogen peroxide and an acid salt which produces divalent magnesium, calcium or barium ions in the presence of said hydrogen peroxide.
(h) a compound which produces ferricyanide ions, hypophosphoric ions, or phosphorous acid ions in an aqueous solution.
(i) a mixture of an acid salt of cobalt or nickel with a nitrite compound or nickel with a nitrite compound or hydrogen peroxide
(j) a nitrite 13. The toner of claim 1 wherein said polymer particles have a molecular weight of 50,000 to 1,000,000.

14. The toner of claim 13 wherein said molecular weight is 50,000 to 200,000.

15. The toner of claim 1 wherein said polymer particles are a bridge structure resulting from polymerization in the presence of a bridging agent.

16. The toner of claim 15 wherein said bridging agent has at least two double bonds.

17. The toner of claim 16 wherein said bridging agent is taken from the class consisting of divinyl compounds and derivatives thereof, diethylene carboxylic acid esters, compounds having at least three vinyl groups, dihydric alcohols, dibasic acids and derivatives thereof, anhydrides of said dibasic acids, esters of said dibasic acids or said anhydrides with lower alcohols, polyhydric alcohols having at least three hydroxy groups, and polyhydric carboxylic acids having at least three hydroxy groups.

18. The toner of claim 17 wherein said bridging agent is taken from the class consisting of divinyl benzene, divinyl naphthalene and derivatives thereof, ethyleneglycol dimethacrylate, diethylene-glycol methacrylate, triethylene-glycol methacrylate, trimethylol-propane triacrylate, acryl methacrylate, t-butyl-aminoethyl methacrylate, tetraethylene-glycol dimethacrylate, 1,3-butane-diol dimethacrylate, N,N-divinyl aniline, divinyl ether, divinyl sulfide, divinyl sulfone, ethylene glycol, triethylene glycol, 1,2-propylene glycol, 1,3-propylene glycol, 1,4-butane diol, neopentyl glycol, 1,4-butene diol, 1,4-bis (hydroxy-methyl) cyclohexane, bis-phenol A, hydrogenated bis-phenol A, polyoxy-ethylenated bis-phenol A, polyoxy-propylenated bisphenol A, maleic acid, fumaric acid, mesaconic acid, citraconic acid, itaconic acid, glutaconic acid, phthalic acid, isophthalic acid, terephthalic acid, cyclohexane-dicarboxylic acid, succinic acid, adipic acid, sebacic acid, malonic acid, anhydrides of said acids, esters of said acids with lower alcohols, glycerol, trimethylol propane, pentaerythritol, trimellitic acid, and pyromellitic acid.

19. The toner of claim 1 which contains a mold releasing agent which is a polymer of a low molecular weight olefin or a copolymer of an olefinic with non olefinic monomers.

20. The toner of claim 19 wherein said olefin is taken from the class consisting of ethylene, propylene, butene, pentene, hexene, heptene, octene, nonene, decene, 3-methyl butene, 3 methyl pentane, and 3-propyl-5-methyl-hexene.

21. The toner of claim 19 wherein said non olefinic monomers are taken from the class consisting of vinyl ethers, vinyl esters, halo-olefins, acrylic and methacrylic acid esters, acryl derivatives, organic acids, diethyl fumarate, and β-pinene.

22. The toner of claim 1 wherein said agent is taken from the class consisting of molybdic acid salts of alkali metals, ammonium, and magnesium; nitrous acid salts of alkali metals, alkaline earth metals, and antimony; halogenated compounds such as potassium bromide, sodium bromide, potassium iodide, sodium iodide, calcium iodide, and ammonium iodide; manganese compounds such as manganese chloride, manganese nitrate, manganese sulfate, manganese acetate, manganese methacrylate; calcium chloride, magnesium chloride, magnesium sulfate, magnesium acetate, barium chloride, potassium ferricyanate, potassium hypophosphite, sodium hypophosphite, potassium phosphite, hydrochloric acid salts, nitric acid salts and sulfuric acid salts of cobalt and nickel; hexamine cobalt (III) chloride, and ammonium nickel sulfate.

23. The toner of claim 1 wherein a dispersing agent is present.

24. The toner of claim 1 wherein said monomer is taken from the class consisting of ethylenically unsaturated mono olefins, styrenes and derivatives thereof, α-methylene aliphatic monocarboxylic acid esters, acrylic or methacrylic acid derivatives, vinyl ethers, vinyl esters, vinyl ketones, N-vinyl compounds, and vinyl naphthalenes.

25. The toner of claim 24 wherein said monomer is taken from the class consisting of styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chlorostyrene, 3,4-dichlorostyrene, and the derivatives thereof, ethylene, propylene, butylene, isobutylene, vinyl chloride, vinylidene chloride, vinyl bromide, vinyl fluoride, vinyl acetate, vinyl propionate, vinyl benzoate, vinyl butyrate, methyl acrylate, ethyl acrylate, n-butyl acrylate, isobutyl acrylate, propyl acrylate, n-octyl acrylate, dodecyl acrylate, 2-ethyl-hexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethyl hexyl methacrylate, stearyl methacrylate, phenyl methacrylate, dimethyl-amino-ethyl methacrylate, diethyl-amino-ethyl methacrylate, acrylonitrile, methacrylonitrile, acrylamide, vinyl methyl ether, vinyl ethyl ether, vinyl iso-butyl ether, vinyl-methyl ketone, vinyl-hexyl ketone, vinyl-isopropenyl ketone, N-vinyl pyrrole, N-vinyl carbazole, N-vinyl indole, N-vinyl pyrolidone, and vinyl naphthalene.

* * * * *